United States Patent
Iwata

(10) Patent No.: US 7,431,445 B2
(45) Date of Patent: Oct. 7, 2008

(54) LIQUID EJECTION APPARATUS

(75) Inventor: Yuji Iwata, Suwa (JP)

(73) Assignee: Seiko Epson Corporation (JP)

( * ) Notice: Subject to any disclaimer, the term of this patent is extended or adjusted under 35 U.S.C. 154(b) by 316 days.

(21) Appl. No.: 11/389,654

(22) Filed: Mar. 24, 2006

(65) Prior Publication Data

US 2006/0215006 A1   Sep. 28, 2006

(30) Foreign Application Priority Data

Mar. 28, 2005   (JP) ............................. 2005-092901

(51) Int. Cl.
*B41J 2/01* (2006.01)
*B41J 3/00* (2006.01)

(52) U.S. Cl. .......................................... 347/102; 347/2

(58) Field of Classification Search ................. 347/102, 347/8, 107, 2; 101/488; 219/216; 346/25; 399/320

See application file for complete search history.

(56) References Cited

U.S. PATENT DOCUMENTS

| 5,748,211 | A  | * | 5/1998 | Shinozaki et al. | .............. | 347/51 |
| 6,562,413 | B1 | * | 5/2003 | Morgavi | ....................... | 427/466 |
| 6,783,227 | B2 | * | 8/2004 | Suzuki et al. | ............... | 347/102 |

| 2004/0189750 | A1 |   | 9/2004 | Miura et al. |
| 2006/0023046 | A1 | * | 2/2006 | Miura et al. ................. 347/102 |

FOREIGN PATENT DOCUMENTS

| JP | 05-309835 | | 11/1993 |
| JP | 06-023980 | | 2/1994 |
| JP | 11-077340 | | 3/1999 |
| JP | 2001010058 | A  * | 1/2001 |
| JP | 2003-127537 | | 5/2003 |
| KR | 20040067905 | | 7/2004 |

* cited by examiner

*Primary Examiner*—Stephen D Meier
*Assistant Examiner*—Leonard S Liang
(74) *Attorney, Agent, or Firm*—Harness, Dickey & Pierce, P.L.C.

(57) ABSTRACT

A liquid ejection apparatus has an ejecting portion that ejects a droplet of a liquid containing a functional material onto an object. The ejecting portion includes a transmittable member. A laser radiating portion radiates a laser beam onto the transmittable member. The transmittable member divides the laser beam into a first laser beam and a second laser beam. The first laser beam transmits through the transmittable member in such a manner that a radiating position of the first laser beam coincides with a droplet receiving position at which the droplet is received by the object or a position in the vicinity of the droplet receiving position. The second laser beam reaches a position defined on the object different from the radiating position of the first laser beam. This structure ensures accurate laser radiation onto the droplet and efficient drying and baking of the droplet.

11 Claims, 7 Drawing Sheets

LIQUID EJECTION APPARATUS

CROSS-REFERENCE TO RELATED APPLICATIONS

This application is based upon and claims the benefit of priority from prior Japanese Patent Application No. 2005-092901, filed on Mar. 28, 2005, the entire contents of which are incorporated herein by reference.

BACKGROUND OF THE INVENTION

The present invention relates to liquid ejection apparatuses.

Typically, an electro-optic apparatus such as a liquid crystal display and an organic electroluminescence display (an organic EL display) includes a plurality of electro-optic elements formed on a substrate. An identification code or a product number is marked on the substrate for the sake of quality control and product control. The identification code is defined by a two-dimensional code that represents the product number of the substrate. The identification code is readable and decoded by a specific code reader, or an identifying member.

In order to mark an identification code on a substrate, a metal-foiled film may be arranged to be opposed to the substrate (which is defined by a glass substrate). Laser radiation is then performed so as to transfer a metal film onto the substrate, thus marking the identification code on the substrate. Alternatively, water containing abrasive may be ejected onto the substrate in such a manner as to mark a numeral on the substrate. For more detailed information, refer to Japanese Laid-Open Patent Publication Nos. 11-77340 and 2003-127537.

However, the aforementioned code marking methods each include a number of steps and need an expensive and large-scaled apparatus. Thus, to avoid these problems, an inkjet method has been considered as an alternative to the conventional methods. The inkjet method is performed by a relatively small-scaled apparatus and shortens the time needed for forming an identification code. More specifically, the inkjet method involves use of a liquid ejection apparatus that ejects functional liquid (ink droplets) onto a substrate through nozzles. This forms the identification code, which is defined by a two-dimensional bar code or the like, on the substrate.

Japanese Laid-Open Patent Publication No. 5-309835, for example, describes a technique for easily mass-producing inkjet type liquid ejection heads that increase ejection density and improve ejection accuracy. More specifically, patterning is performed on a silicon wafer of (110) plane orientation. Bores are then defined in prescribed portions of the wafer. Subsequently, crystal anisotropic etching is performed on the wafer. This forms a liquid ejection head including ink nozzle bores, each of which is defined by (111) planes perpendicular to a surface of the wafer, provided integrally with ink pressure chambers.

Further, Japanese Laid-Open Patent Publication No. 6-23980, for example, describes a technique related to an inkjet recording apparatus having a configuration that improves efficiencies for performing mass-production and conducting tests. In this inkjet recording apparatus, ejection performance of a liquid ejection head is estimated simply and efficiently using an optical power meter. The liquid ejection head includes separate ejection chambers, oscillation plates, drive portions, and a common ink cavity. Each of the ejection chambers communicates with a corresponding nozzle bore. Each of the oscillation plates defines a wall portion of the associated ejection chamber and is driven by the corresponding drive portion. The ink cavity supplies ink to each ejection chamber. A transparent electrode substrate is arranged below the oscillation plates and includes an electrode formed by a transparent conductive film. The interior of the liquid ejection head is thus visible from the exterior.

The inkjet method for forming the identification code involves an ejection step and a drying and baking step. In the ejection step, ink droplets are accurately ejected onto desired portions of the substrate. In the drying and baking step, the droplets are dried on the substrate and the functional material of the ink is baked and thus securely bonded with the substrate.

In order to accurately supply the ink droplets to the desired portions of the substrate, the substrate must be arranged close to the liquid ejection head. If the standby period between ejection and drying is excessively long, the droplets may spread or contract in a wet state. To prevent this, it is necessary to perform the dying and baking steps quickly and efficiently following the ejection step. However, since the substrate and the liquid ejection head are located close to each other, the portions of the substrate that have received the droplets are shielded by the liquid ejection head. Thus, the drying step, which involves laser radiation, must be delayed until the droplets that have been received by the substrate become exposed. Such delay may make it impossible to maintain an appropriate shape of each droplet. To avoid this problem, a transparent substrate stage may be employed if the substrate is transparent. The laser radiation is thus performed through the backside of the substrate, which is mounted on the substrate stage. However, this option is applicable only to the transparent substrates.

SUMMARY

Accordingly, it is an objective of the present invention to provide a liquid ejection apparatus that accurately performs laser radiation onto a liquid droplet containing functional material, which has been ejected by the apparatus, and thus efficiently performs drying and baking of the liquid droplet.

According to a first aspect of the invention, a liquid ejection apparatus includes an ejecting portion that ejects a droplet of a liquid containing a functional material onto an object. The ejecting portion includes a pressure chamber in which the liquid is retained, a pressurizing portion, and a transmittable member. The pressurizing portion pressurizes the pressure chamber so as to eject the droplet. A laser radiating portion radiates a laser beam onto the transmittable member. The transmittable member divides the laser beam into a first laser beam and a second laser beam. The first laser beam transmits through the transmittable member in such a manner that a radiating position of the first laser beam coincides with a droplet receiving position at which the droplet is received by the object or a position in the vicinity of the droplet receiving position. The second laser beam reaches a position defined on the object different from the radiating position of the first laser beam.

According to a second aspect of the invention, a liquid ejection apparatus includes an ejecting portion that ejects a droplet of a liquid containing a functional material onto an object. The ejecting portion includes a transmittable member. A laser radiating portion radiates a laser beam onto the transmittable member. The transmittable member divides the laser beam into a first laser beam and a second laser beam. The first laser beam is radiated onto the droplet immediately after the droplet has been received by the object. The second laser beam is radiated onto the droplet after the droplet has been irradiated with the first laser beam.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will hereafter be described with reference to FIGS. 1 to 10.

Display Module of Liquid Crystal Display

A display module 1 of a liquid crystal display on which an identification code (dot pattern) 10 is formed by a liquid ejection apparatus 20 will now be explained.

Figure 1:
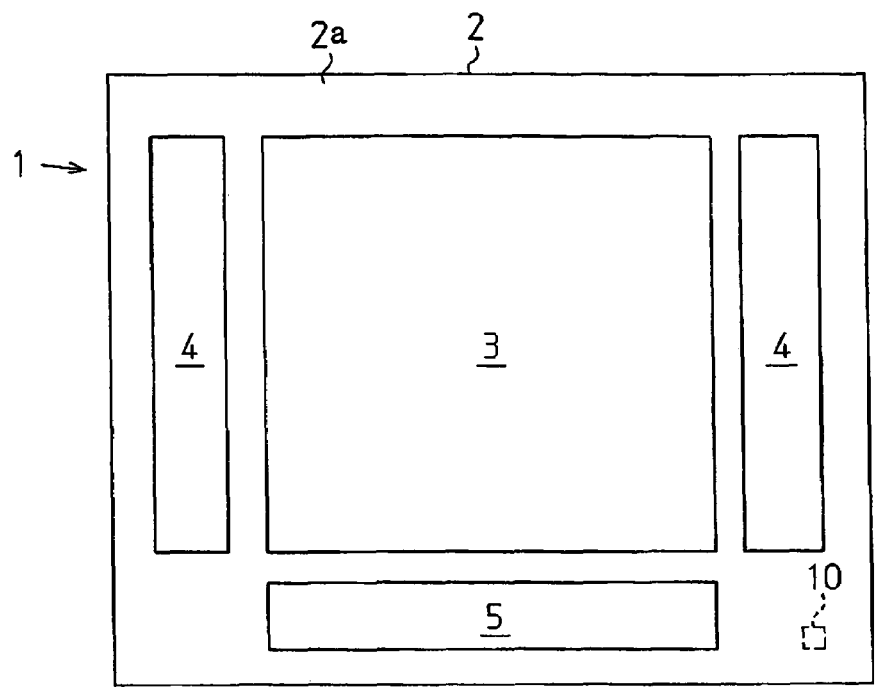
FIG. 1 is a front view showing a liquid crystal display module of a liquid crystal display according to an embodiment of the present invention.

As shown in FIG. 1, the liquid crystal display module 1 includes a substrate 2 formed of glass, which serves as a light-transmittable display substrate. A rectangular display portion 3 is formed substantially in the center of a surface 2a of the substrate 2. Liquid crystal molecules are sealed in the display portion 3. A scanning line driver circuit 4 and a data line driver circuit 5 are arranged outside the display portion 3. The scanning line driver circuit 4 generates scanning signals and the data line driver circuit 5 generates data signals. In correspondence with the signals, the liquid crystal display module 1 controls orientation of the liquid crystal molecules. The liquid crystal display module 1 modulates area light emitted by a non-illustrated illumination device in accordance with the orientations of the liquid crystal molecules. In this manner, a desired image is displayed on the display portion 3.

Figure 2:
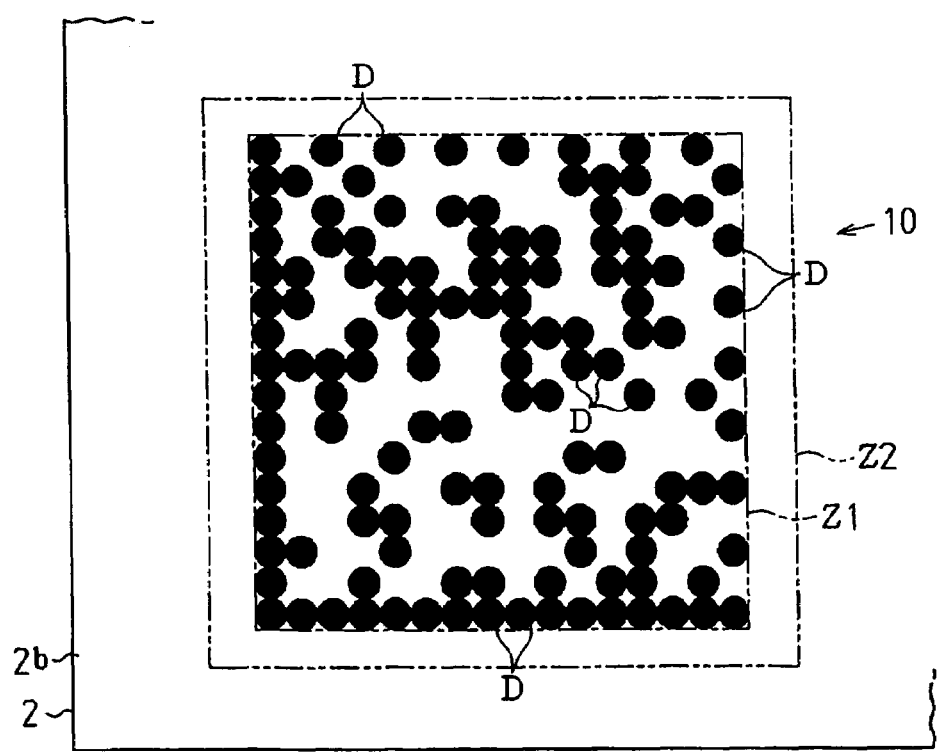
FIG. 2 is a view showing an identification code formed on a backside of the liquid crystal display module of the display of FIG. 1.

The identification code 10 of the liquid crystal display module 1, which is defined by dots D, is formed in a bottom right corner of a backside 2b of the substrate 2, or a droplet receiving surface, as viewed in FIG. 1. Referring to FIG. 2, the identification code 10 is formed by the multiple dots D. The dots D are provided in a dot formation area Z1. A prescribed blank area Z2 is defined around the outer circumference of the dot formation area Z1. In this embodiment, the identification code 10 in the dot formation area Z1 is defined by a two-dimensional code and thus readable by a two-dimensional code reader. The blank area Z2 is an empty area in which the dots D are not formed. The blank area Z2 thus permits identification of the dot formation area Z1 by the two-dimensional code reader and prevents erroneous detection of the identification code 10, which is contained in the dot formation area Z1.

Figure 4:
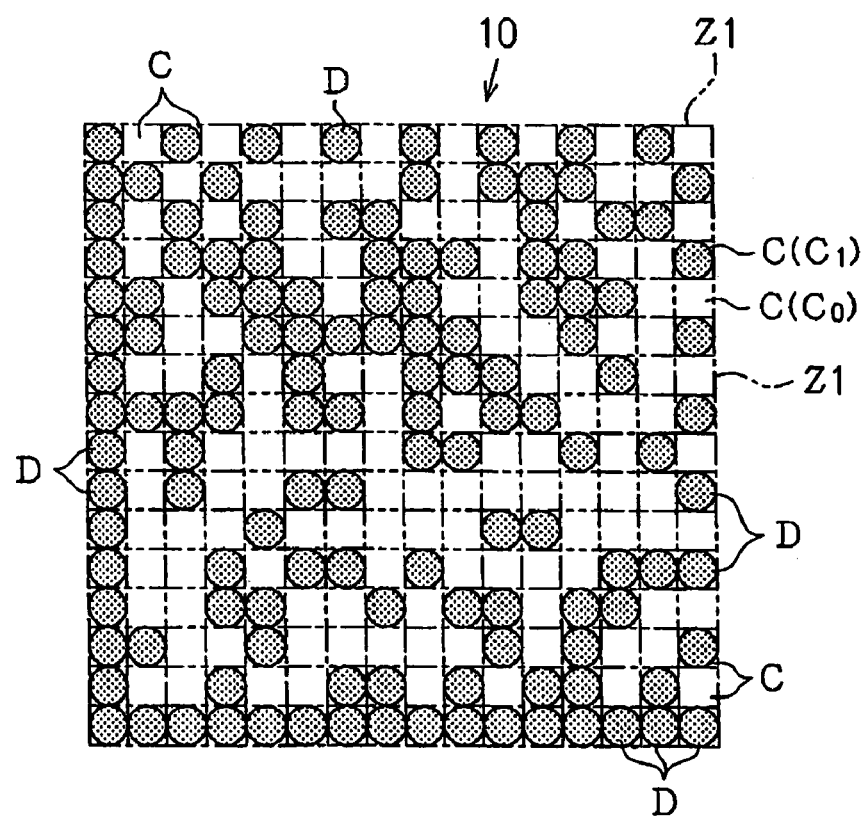
FIG. 4 is a view for explaining the identification code of FIG. 2.

As shown in FIG. 4, the dot formation area Z1 has a square shape each side of which is 1 to 2 millimeters. The dot formation area Z1 is thus virtually divided into cells C aligned by 16 rows×16 columns. The dots D are provided in selected ones of the cells C. Each of the cells C in which the dot D is formed is defined as a black cell C1. Each of the empty cells C is defined as a blank cell C0 (a non-dot section). The dots D, which are formed in the selected cells C, define the identification code 10 (defined by the two-dimensional code) that identifies the product number or the lot number of the display module 1. Referring to FIG. 4, the rows of the cells C are sequentially numbered from up to down as a first row to a sixteenth row, as viewed in the drawing. The columns of the cells C are sequentially numbered from the left to the right as a first column to a sixteenth column, as viewed in FIG. 4.

Figure 3:
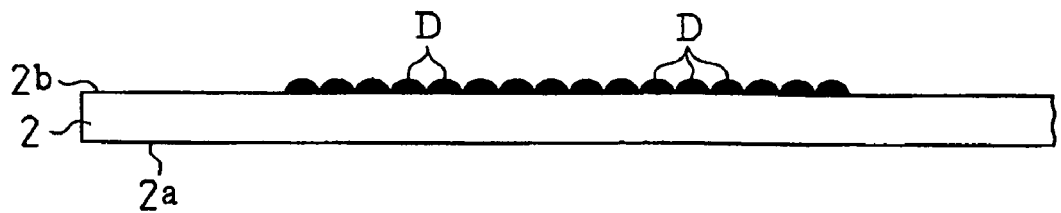
FIG. 3 is a side view showing the identification code of FIG. 2.

With reference to FIGS. 2 and 3, each of the dots D, which is provided in the corresponding black cell C1 (dot section), is securely bonded with the substrate 2 and has a semispherical shape. The dots D are provided by the inkjet method. More specifically, a droplet Fb of functional liquid Fa (FIG. 7) containing manganese particles as functional material is ejected onto the corresponding cell C (black cell C1) through a nozzle N, which is defined in the liquid ejection apparatus 20, which will be later described. The droplet Fb is then dried in the black cell C1 and the manganese particles in the droplet Fb are baked, thus forming the semispherical dot D bonded securely with the substrate 2. Such drying and baking of each droplet Fb are performed by radiating laser beams onto the droplet Fb that has been received by the substrate 2 (the corresponding black cell C1).

Liquid Ejection Apparatus

The liquid ejection apparatus 20, which forms the identification code 10 on the backside 2b of the substrate 2, will hereafter be described.

Figure 5:
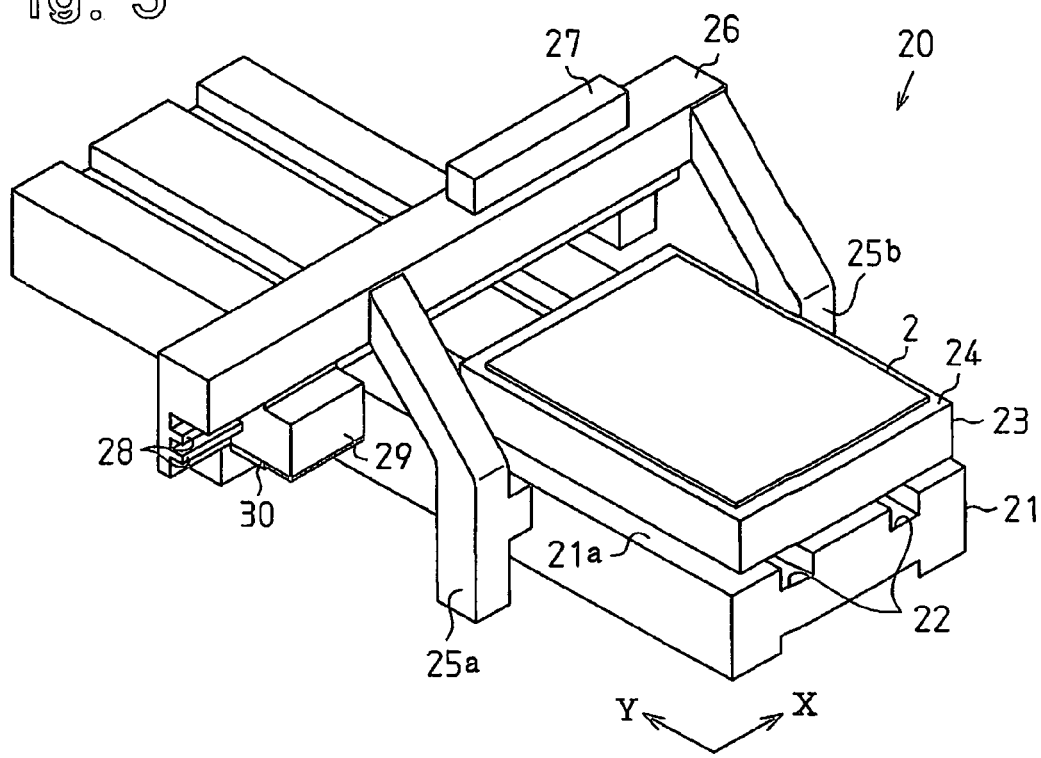
FIG. 5 is a perspective view showing a main portion of a liquid ejection apparatus for forming the identification code of FIG. 2.

FIG. 5 is a perspective view showing the liquid ejection apparatus 20, which ejects the droplets Fb defining the identification code 10 onto the backside 2b of the substrate 2.

As shown in FIG. 5, the liquid ejection apparatus 20 includes a parallelepiped base 21. In the illustrated embodiment, the longitudinal direction of the base 21 is defined as direction Y and a direction perpendicular to direction Y is defined as direction X.

A pair of guide grooves 22 are defined in an upper surface 21a of the base 21 and extend entirely along the base 21 in direction Y. A substrate stage 23 is secured to an upper portion of the base 21. The substrate stage 23 has a linear movement mechanism (not shown) provided in correspondence with the guide grooves 22. The linear movement mechanism is formed by a threaded type that has threaded shafts (drive shafts) extending along the guide grooves 22 and ball nuts engaged with the threaded shafts. The drive shafts are connected to a y-axis motor MY (see FIG. 9), which is formed by a stepping motor. In response to a drive signal corresponding to a predetermined number of steps, which is input to the y-axis motor MY, the y-axis motor MY is rotated in a forward direction or a reverse direction. This reciprocates (moves) the substrate stage 23 at a predetermined speed along direction Y by a distance corresponding to the number of steps.

In the illustrated embodiment, when the substrate stage 23 is located at a foremost position of the base 21 in direction Y as shown in FIG. 5, the corresponding position is referred to as a proceeding position of the substrate stage 23. In contrast, when the substrate stage 23 is located at a rearmost position of the base 21 in direction Y, the corresponding position is referred to as a returning position of the substrate stage 23.

The upper surface of the substrate stage 23 forms a mounting surface 24 having a suction type substrate chuck mechanism (not shown). After the substrate 2 is mounted on the mounting surface 24, the substrate chuck mechanism operates to position and fix the substrate 2 at a predetermined position on the mounting surface 24. Specifically, the dot formation area Z1 is arranged on the mounting surface 24 in such a manner that the columns of the cells C extend along direction Y with the first row of the cells C located foremost in direction Y.

A pair of supports 25a, 25b are arranged at opposing sides of the base 21 in direction X and extend upward. A guide member 26 is supported by the supports 25a, 25b and extends along direction X. The longitudinal dimension of the guide member 26 is greater than the dimension of the substrate stage 23 in direction X. An end of the guide member 26 projects outwardly with respect to the support 25a.

A reservoir 27 is mounted on the upper side of the guide member 26 and retains the functional liquid Fa containing the manganese particles. A pair of guide rails 28 are formed along the lower side of the guide member 26 and extend along direction X. A carriage 29 is movably supported by the guide rails 28 and includes a linear movement mechanism (not shown) formed by, for example, a threaded shaft (a drive shaft) and a ball nut. The drive shaft of the mechanism extends along the guide rails 28 and the ball nut is engaged with the threaded shaft. The drive shaft is connected to an x-axis motor MX (see FIG. 9). In response to a prescribed pulse signal, the x-axis motor MX is rotated in a forward direction or a reverse direction in accordance with a corresponding number of steps. In other words, in response to a drive signal corresponding to a predetermined number of steps, which is input to the x-axis motor MY, the x-axis motor MX is rotated in a forward or reverse direction, thus reciprocating the carriage 29 along direction X by the distance corresponding to the number of steps.

Figure 6:
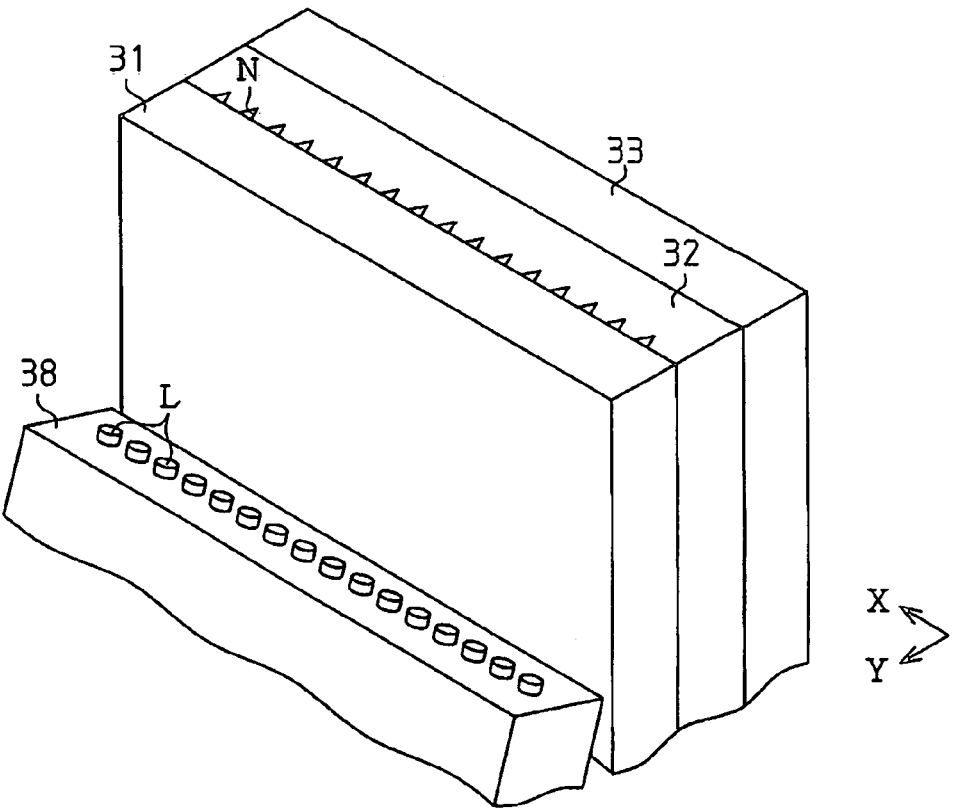
FIG. 6 is a perspective view showing a liquid ejection head incorporated in the liquid ejection apparatus of FIG. 5.
Figure 7:
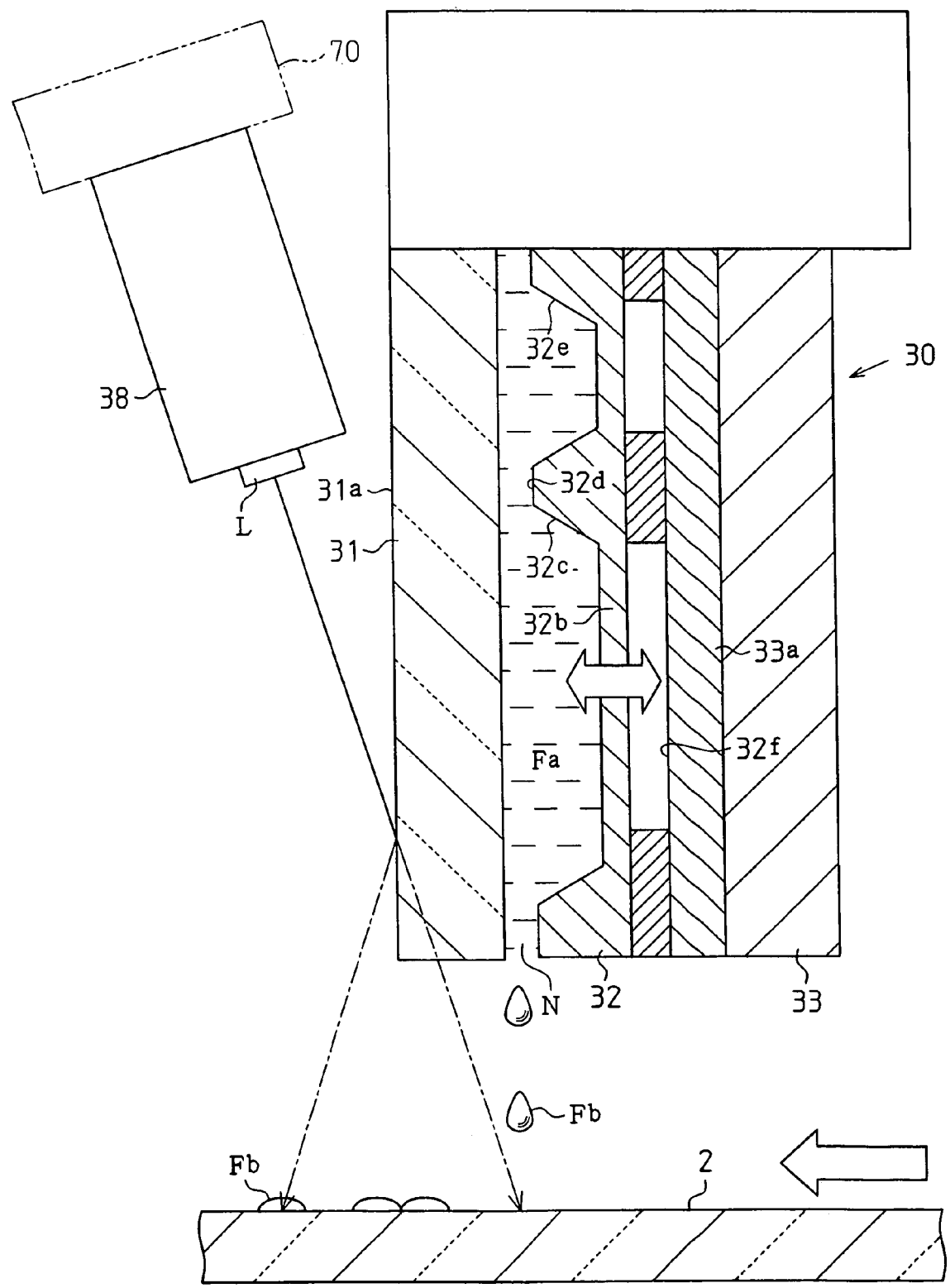
FIG. 7 is a cross-sectional view showing a main portion of the liquid ejection head of FIG. 6.
Figure 8:
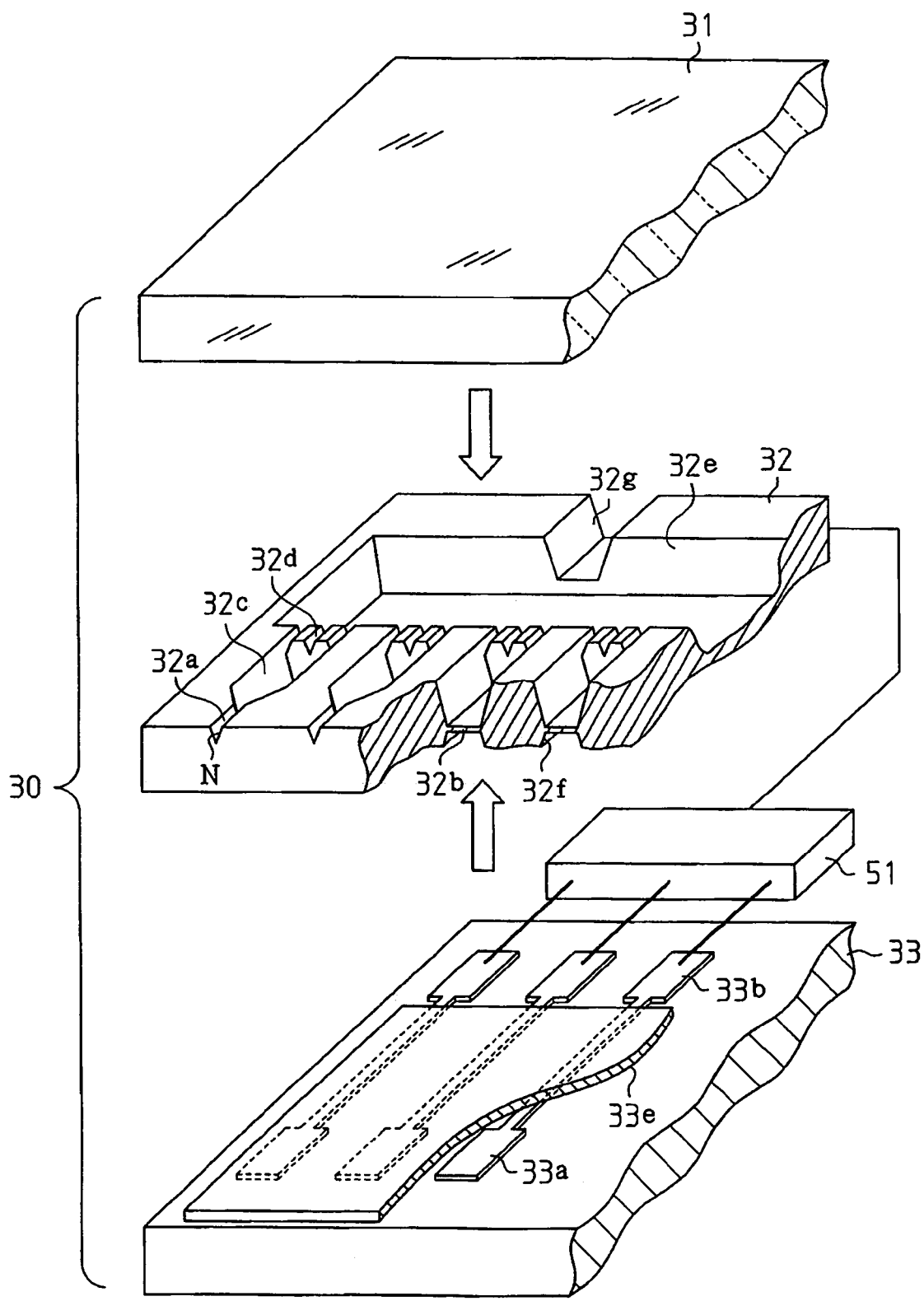
FIG. 8 is an exploded perspective view showing the liquid ejection head of FIG. 6.

A liquid ejection head 30, or a liquid ejecting portion, is formed integrally with the carriage 29. FIG. 6 is a perspective view showing the liquid ejection head 30 with the lower surface (corresponding to the substrate stage 23) facing upward. FIG. 7 is a cross-sectional view showing a main portion of the liquid ejection head 30. FIG. 8 is an exploded perspective view showing the main portion of the liquid ejection head 30. FIG. 8 includes parts shown in cross-sectional views.

With reference to FIG. 6, sixteen nozzles, which are ejection ports through which the identification code 10 is provided, extend through the liquid ejection head 30. The nozzles N are aligned in a single row and equally spaced in direction X (the extending direction of each row of the cells C). The pitch of the nozzles N is equal to the pitch of the cells C. Thus, when the substrate 2 (the dot formation area Z1) linearly reciprocates in direction Y, the nozzles N are arranged to be opposed to the corresponding row of the cells C.

As shown in FIG. 7, the liquid ejection head 30 has a layered structure including a first substrate 31, a second substrate 32, and a third substrate 33. The first to third substrates 31 to 33 are stacked together and bonded together in this state. The first substrate 31 is formed of transparent borosilicate glass and has a flat plate-like shape. A metal thin film 31a is deposited on an outer surface of the first substrate 31. The metal thin film 31a is laser transmittable and functions also as a reflective film. The metal thin film 31a is provided by vapor-depositing a metal film having a predetermined thickness on a surface of the borosilicate glass material. The second substrate 32 is bonded with the first substrate 31 and formed of processed silicon. The third substrate 33 is bonded with the second substrate 32 and formed of borosilicate glass. Referring to FIG. 6, the nozzles N extend between the first and second substrates 31, 32.

More specifically, as shown in FIG. 7, cavities 32c, or pressure chambers, are defined at positions corresponding to the nozzles N. The cavities 32c communicate with the reservoir 27 and each receive the functional liquid Fa, which is retained in the reservoir 27. The functional liquid Fa is defined by the liquid prepared by dispersing the manganese particles, or the functional material, in a dispersion medium.

A side wall of each cavity 32c forms an oscillation plate 32b that oscillates in a horizontal direction and thus selectively increases or decreases the volume of the cavity 32c. An electrostatic actuator having an electrode 33a is provided to be opposed to each oscillation plate 32b in direction Y. An oscillation chamber 32f is defined between the oscillation plate 32b and the electrostatic actuator. In the illustrated embodiment, the oscillation plates 32b, the oscillation chambers 32f, and the electrostatic actuators each function as a pressurizing portion that pressurizes the droplets Fb. In other words, a head driver circuit 51 provides the pulse voltage of 0 to 100 volts to any one of the electrodes 33a, thus charging the surface of the electrode 33a positively. The corresponding oscillation plate 32b is thus charged negatively. This causes the oscillation plate 32b to deform toward the electrode 33a through electrostatic suction brought about by the stored charge. The volume of the corresponding cavity 32c thus increases. Accordingly, the functional liquid Fa flows from a liquid retainer portion 32e into the cavity 32c through an orifice 32d. After the stored charge has been discharged, the oscillation plate 32b is released and thus the volume of the cavity 32c decreases. The functional liquid Fa containing the manganese particles is thus ejected onto the substrate 2 through the corresponding nozzle N as the droplet Fb by an amount corresponding to the decreased volume of the cavity 32c.

The second substrate 32 and the third substrate 33 of the liquid ejection head 30 are configured as follows.

As shown in FIG. 8, a plurality of nozzle grooves 32a and a plurality of grooves are defined in a surface of the second substrate 32. The nozzle grooves 32a are equally spaced, and each groove communicates with the corresponding nozzle groove 32a. Each groove includes a section defining the cavity 32c, a section defining the orifice 32d, and a section defining the liquid retainer portion 32e. When the first substrate 31 and the second substrate 32 are held in tight contact with each other, the grooves are shielded by the first substrate 31 in such a manner that the cavities 32c, the orifices 32d, and the liquid retainer portions 32e are provided. The side wall of each cavity 32c forms the oscillation plate 32b. The orifice 32d introduces the functional liquid Fa into the cavity 32c. The liquid retainer portion 32e is defined by a recess communicating with the orifice 32d and supplies the functional liquid Fa to the cavities 32c. A functional liquid supply port 32g is connected to the reservoir 27, from which the functional liquid Fa is supplied to the liquid retainer portions 32e, through a connection pipe (not shown).

A side of each oscillation plate 32b opposed to the corresponding groove including the cavity 32c provides a recess that defines the oscillation chamber 32f. The recess is e opposed to the corresponding electrode 33a, which is provided in the third substrate 33. Thus, when the second substrate 32 and the third substrate 33 are held in tight contact with each other, the recesses is shielded by the third substrate 33 and the oscillation chambers 32f are defined correspondingly.

The electrode 33a is formed at a position corresponding to each oscillation plate 32b through sputtering. Each electrode 33a is formed of ITO having a thickness of approximately 0.1 micrometers and has a shape corresponding to the shape of the oscillation plate 32b. Each electrode 33a is connected to a terminal 33b through a lead portion. An insulating layer 33e is formed in a portion other than the terminals 33b. The insulating layer 33e is covered by a sputtering film formed of borosilicate glass having a thickness of approximately 0.2 micrometers. The insulating layer 33e prevents an insulation breakdown or a short circuit when the liquid ejection apparatus 20 is starting.

The first and second substrates 31, 32 are anode-bonded with each other. The second and third substrates 32, 33 are also bonded in the same manner as the first and the second substrates 31, 32. Assembly of the liquid ejection head 30 is thus completed. Afterwards, the head driver circuit 51 is provided in such a manner as to connect the second substrate 32 to the terminals 33b of the electrodes 33a.

As shown in FIG. 6, the carriage 29 includes a laser radiation device 38 at a side of the liquid ejection head located foremost in direction Y. The laser radiation device 38 includes sixteen semiconductor lasers L. The radiating portions of the semiconductor lasers L are arranged in parallel as aligned in a single row and equally spaced in direction X. The row of the semiconductor-lasers L is arranged parallel with the nozzle row defined by the sixteen nozzles N. The semiconductor lasers L are spaced from the corresponding nozzles N by uniform distances.

Each of the semiconductor lasers L is inclined in such a manner that the laser beam radiated by the semiconductor laser L diagonally transmits through the first substrate 31. The laser beam radiated by each semiconductor laser L is thus divided into a first laser beam that transmits through the first substrate 31 and a second laser beam reflected by the surface of the first substrate 31 as illustrated in FIG. 7. The inclination of the semiconductor laser L is adjusted in such a manner that the first laser beam reaches at a position in the vicinity of a receiving position of the droplet Fb ejected by the corresponding nozzle N. The first laser beam thus serves to dry the droplet Fb that has been received by the substrate 2. The second laser beam, which has been reflected by the first substrate 31, serves to bake the droplet Fb. In the illustrated embodiment, the permittivity of the first substrate 31 (the surface of the first substrate 31) and the inclination angle of each semiconductor laser L are selected in such a manner that the amount of the transmitted light becomes greater than the amount of the reflected light. Further, the second laser beam is radiated onto the cell C spaced from the receiving position of the corresponding droplet Fb by a distance corresponding to a predetermined number of rows.

Electric Block Circuit

An electric block circuit of the liquid ejection apparatus 20, which is constructed as above-described, will hereafter be explained with reference to FIG. 9.

Figure 9:
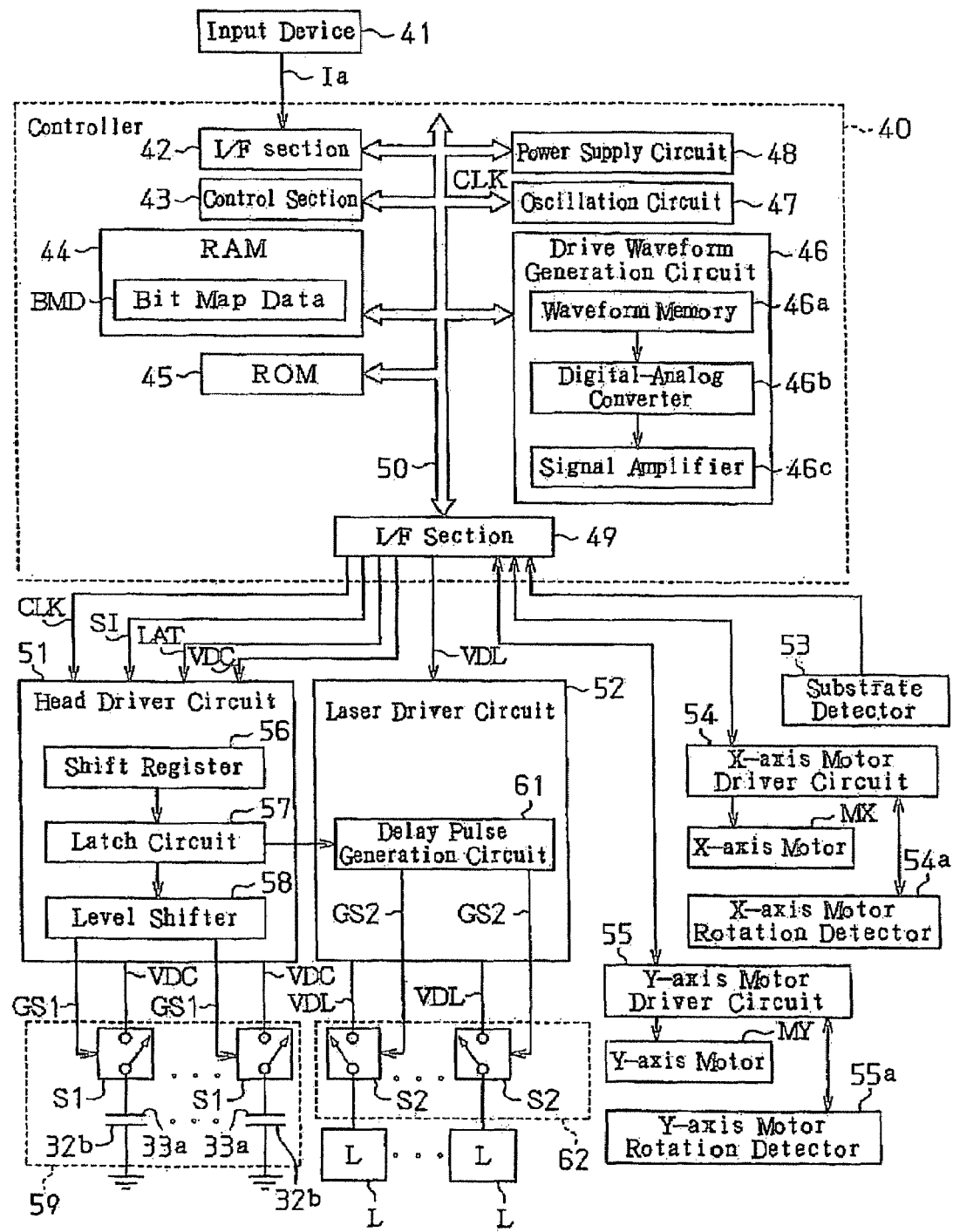
FIG. 9 is a block diagram representing an electric circuit defined in the liquid ejection apparatus of FIG. 5.

As shown in FIG. 9, a controller 40 has an I/F section 42, a control section 43 including a CPU, a RAM 44, and a ROM 45. The I/F section 42 receives various data from an input device 41, which is formed by, for example, an external computer. The RAM 44 is defined by a DRAM and an SRAM and stores various data. The ROM 45 stores different control programs. The controller 40 also includes a drive waveform generation circuit 46, an oscillation circuit 47, a power supply circuit 48, and an I/F section 49. The oscillation circuit 47 generates a clock signal CLK for synchronizing different drive signals. The power supply circuit 48 generates laser drive voltage VDL for driving the semiconductor lasers L. The I/F section 49 transmits various signals. In the controller 40, the I/F section 42, the control section 43, the RAM 44, the ROM 45, the drive waveform generation circuit 46, the oscillation circuit 47, the power supply circuit 48, and the I/F section 49 are connected together through a bus 50.

The I/F section 42 receives an image of the identification code 10 as a prescribed form of dot formation data Ia. The identification code 10 is defined as a two-dimensional code formed by a known method and represents identification data regarding the product number or the lot number of the substrate 2.

In correspondence with the dot formation data Ia received by the I/F section 42, the control section 43 performs an identification code formation procedure. That is, the control section 43 executes a control program (for example, an identification code formation program) stored in the ROM 45 using the RAM 44 as a processing area. In accordance with the program, the control section 43 carries out a transport procedure for transporting the substrate 2 by moving the substrate stage 23 and a droplet ejection procedure by activating the electrostatic actuators of the liquid ejection head 30, each of which includes the electrode 33a and the oscillation plate 32b. Further, in accordance with the identification code formation program, the control section 43 drives the semiconductor lasers L and thus performs a drying procedure for drying the droplets Fb.

More specifically, the control section 43 performs a prescribed development procedure on the dot formation data Ia received by the I/F section 42. This produces bit map data BMD that indicates whether the droplets Fb must be ejected onto the cells C that are defined on a two-dimensional identification code formation plane (the dot formation area Z1). The bit map data BMD is then stored in the RAM 44. The bit map data BMD is defined by serial data that has a bit length of 16×16 bits in correspondence with the electrostatic actuators. That is, in accordance with the value (0 or 1) of each bit, the corresponding electrostatic actuator, which includes the oscillation plate 32b and the electrode 33a, is selectively activated.

The control section 43 performs an additional development procedure, which is different from the development procedure corresponding to the bit map data BMD, on the dot formation data Ia. This produces waveform data of electrostatic actuator drive voltage VDC that is supplied to each of the electrostatic actuators. The waveform data is then output to the drive waveform generation circuit 46. The drive waveform generation circuit 46 has a waveform memory 46a, a digital-to-analog converter section 46b, and a signal amplifier 46c. The waveform memory 46a stores the waveform data, which has been generated by the control section 43. The digital-to-analog converter section 46b converts the waveform data into an analog signal and outputs the analog signal. The signal amplifier 46c amplifies the analog waveform signal, which has been sent from the digital-to-analog converter section 46b. Thus, the drive waveform generation circuit 46 converts the waveform data stored in the waveform memory 46a into the analog signal by means of the digital-to-analog converter section 46b. The analog waveform signal is then amplified by the signal amplifier 46c and thus the electrostatic actuator drive voltage VDC is generated.

Further, the control section 43 serially transfers the data based on the bit map data BMD as an ejection control signal SI to a head driver circuit 51 (a shift register 56), which will be later described, through the I/F section 49. The ejection control signal SI is produced by synchronizing the bit map data BMD with the clock signal CLK generated by the oscillation circuit 47. The control section 43 also sends a latch signal LAT to the head driver circuit 51 for latching the transfers ejection control signal SI. Further, the control section 43 supplies the electrostatic actuator drive voltage VDC to the head driver circuit 51 (switch elements S1) synchronously with the clock signal CLK.

The head driver circuit 51, a laser driver circuit 52, a substrate detector 53, an x-axis motor driver circuit 54, and a y-axis motor driver circuit 55 are connected to the controller 40 via the I/F section 49.

The head driver circuit 51 has the shift register 56, a latch circuit 57, a level shifter 58, and a switch circuit 59. The shift register 56 converts the ejection control signal SI, which has been serially transferred from the controller 40 (the control section 43), to a parallel signal in correspondence with the electrodes 33a of the sixteen electrostatic actuators. The latch circuit 57 latches the parallel 16-bit ejection control signal SI synchronously with the latch signal LAT, which has been sent from the controller 40 (the control section 43). The latched ejection control signal SI is then output to the level shifter 58 and the laser driver circuit 52. In correspondence with the latched ejection control signal SI, the level shifter 58 raises the voltage of the latched ejection control signal SI to the drive voltage of the switch circuit 59. In this manner, an open-close signal GS1 is generated in correspondence with each of the electrostatic actuators.

Switch elements S1 are provided in correspondence with the electrodes 33a and connected to the switch circuit 59. The electrostatic actuator drive voltage VDC is supplied commonly to the inputs of the switch elements S1. The outputs of the switch elements S1 are connected to the corresponding electrodes 33a. Each switch element S1 receives the corresponding open-close signal GS1 from the level shifter 58. In correspondence with the open-close signal GS1, it is determined whether the electrostatic actuator drive voltage VDC should be supplied to the corresponding electrostatic actuators.

More specifically, in the liquid ejection apparatus 20 of the illustrated embodiment, the electrostatic actuator drive voltage VDC, which has been generated by the drive waveform generation circuit 46, is supplied to the electrostatic actuators through the corresponding switch elements S1. Further, the controller 40 (the control section 43) generates the ejection control signal SI (the open-close signals GS1) for controlling operation of each switch element S1, thus controlling supply of the electrostatic actuator drive voltage VDC. When any switch element S1 is closed, the electrostatic actuator drive voltage VDC is supplied to the corresponding electrode 33a. The droplet Fb is thus ejected from the nozzle N corresponding to the associated electrostatic actuator. The latch signal LAT is output when each of the rows of the cells C in the dot formation area Z of the substrate 2 reaches the position immediately below the nozzles N. In response to the latch signal LAT, the corresponding electrostatic actuators are activated and the droplets Fb are ejected from the corresponding nozzles N. This forms the dots D in the selected cells C (black cells C1) of the dot formation area Z1.

Figure 10:
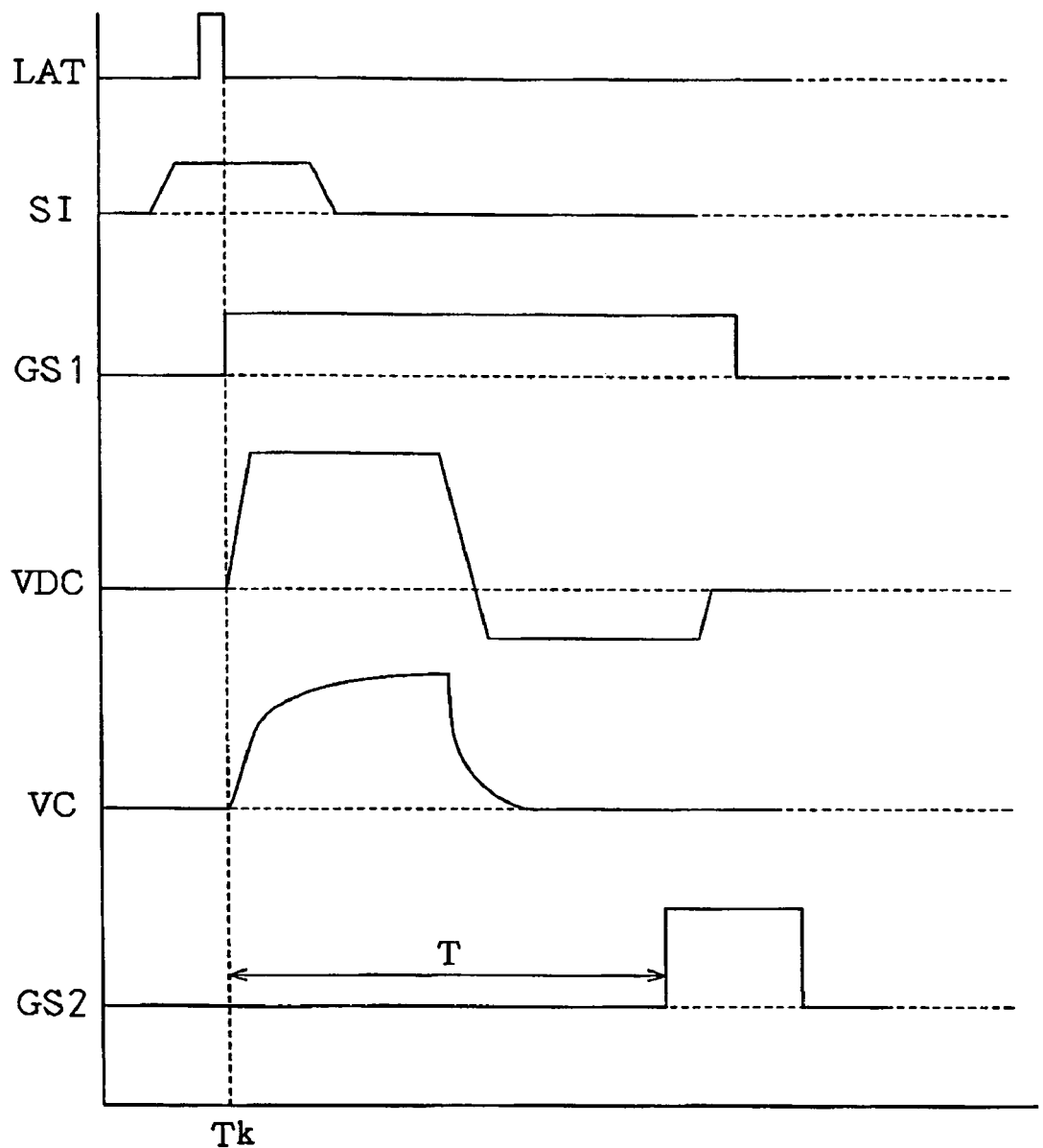
FIG. 10 is a timing chart representing operational timings of the liquid ejection head of FIG. 7 and those of a semiconductor laser.

FIG. 10 shows the pulse waveforms of the latch signal LAT, the ejection control signal SI, and the open-close signal GS1 and the waveform of the electrostatic actuator drive voltage VDC, which is supplied to the corresponding electrostatic actuators in response to the open-close signals GS1. Referring to FIG. 10, in response to the fall of the latch signal LAT, which has been sent from the control section 43 to the head driver circuit 51, the open-close signals GS1 are produced in correspondence with the 16-bit ejection control signal SI. The electrostatic drive voltage VDC is thus supplied to the electrostatic actuators corresponding to the open-close signals GS1 that have been generated. In this state, the voltage VC of each of the corresponding electrodes 33a, which functions as a capacitor with respect to the associated oscillation plate 32b, increases as the electrostatic actuator drive voltage VDC rises. This causes the electrostatic actuators to contract, thus introducing the functional liquid Fa into the corresponding cavities 32c. Subsequently, as the electrostatic actuator drive voltage VDC decreases, the electrostatic actuators send the functional liquid Fa out from the cavities 32c, thus ejecting the droplets Fb. The electrostatic actuator drive voltage VDC then restores the initial value, thus completing the ejection of the droplets Fb through activation of the electrostatic actuators.

As shown in FIG. 9, the laser driver circuit 52 has a delay pulse generation circuit 61 and a switch circuit 62. The delay pulse generation circuit 61 generates a pulse signal (an open-close signal GS2) by delaying the ejection control signal SI that has been latched by the latch circuit 57 in response to the fall of the latch signal LAT by a predetermined time T (specifically, standby time T1 or standby time T2). The open-close signal GS2 is then output to the switch circuit 62. The standby time T1 is defined as the time necessary for each droplet Fb to reach a radiating position of the first laser beam radiated by the semiconductor laser corresponding to the activated electrostatic actuator (the nozzle N associated with the activated electrostatic actuator). The standby time T2 is defined as the time necessary for each droplet Fb to reach a radiating position of the second laser beam radiated by the semiconductor laser corresponding to the activated electrostatic actuator (the nozzle N associated with the activated electrostatic actuator). The standby times T1, T2 are determined with reference to an operational timing of the electrostatic actuator (in response to the fall of the latch signal LAT), which is a reference (a reference point Tk). The standby times T1, T2 are predetermined values obtained by a test or the like. In the illustrated embodiment, the second laser beams are radiated onto the cells C separated from the cells C that are located at the radiating positions of the first laser beams by the distance defined by a predetermined number of rows. The standby time T2 is thus longer than the standby time T1 by an amount corresponding to the distance between the radiating position of each first laser beam and the radiating position of the corresponding second laser beam. After the standby time T1 has elapsed, or when the droplets Fb reach the radiating positions of the first laser beams, the delay pulse generation circuit 61 outputs the corresponding open-close signals GS2 to the switch circuit 62. The delay pulse generation circuit 61 also outputs the corresponding open-close signals GS2 to the switch circuit 62 after the standby time T2 has elapsed, or when the droplets Fb reach the radiating positions of the second laser beams. Each open-close signal GS2 is generated based on the ejection control signal SI that has been latched by the latch circuit 57 in response to the fall of the latch signal LAT.

The switch circuit 62 includes sixteen switch elements S2 in correspondence with the semiconductor lasers L. The laser drive voltage VDL, which has been produced by the power supply circuit 48, is supplied commonly to the inputs of the switch elements S2. The outputs of the switch elements S2 are connected to the corresponding semiconductor lasers L. Each switch element S2 receives the corresponding open-close signal GS2 from the delay pulse generation circuit 61. In correspondence with the open-close signal GS2, it is determined whether the laser drive voltage VDL should be supplied to the corresponding semiconductor laser L. That is, in the liquid ejection apparatus 20 of the illustrated embodiment, the laser drive voltage VDL of the power supply circuit 48 is supplied commonly to the semiconductor lasers L through the corresponding switch elements S2. Further, operation of each switch element S2 is controlled in correspondence with the ejection control signal SI (the open-close signal GS2) provided by the controller 40 (the control section 43). When any switch element S2 is closed, the laser drive voltage VDL is supplied to the semiconductor laser L corresponding to the switch element S2 and a laser beam is radiated by the semiconductor laser L.

In other words, referring to FIG. 10, each open-close signal GS2 is generated after the standby time T1, T2 has elapsed following input of the latch signal LAT to the head driver circuit 51. In response to the rise of the open-close signal GS2, supply of the laser drive voltage VDL to the corresponding semiconductor laser L is started. This optimizes the laser radiating timing of the semiconductor laser L, which radiates a laser beam onto the corresponding droplet Fb that has been received by the substrate 2 (the corresponding black cell C1) and moves along the radiating position of the semiconductor laser L. Afterwards, the open-close signal GS2 falls and thus the supply of the laser drive voltage VDL stops. The drying procedure by means of the semiconductor laser L is thus ended.

The substrate detector 53 is connected to the controller 40 through the I/F section 49. The substrate detector 53 detects an end of the substrate 2. In correspondence with such detection result, the controller 40 calculates the position of the substrate 2 passing immediately below the ejection head 30 (the nozzles N).

The x-axis motor driver circuit 54 is connected to the controller 40 through the I/F section 49. The controller 40 sends an x-axis motor drive signal to the x-axis motor driver circuit 54. In response to the x-axis motor drive signal, the x-axis motor driver circuit 54 operates to rotate the x-axis motor MX, which reciprocates the carriage 29, in the forward or reverse direction. For example, if the x-axis motor MX is rotated in the forward direction, the carriage 29 is moved in direction X. If the x-axis motor MX is rotated in the reverse direction, the carriage 29 is moved in a direction opposed to direction X.

An x-axis motor rotation detector 54a is connected to the controller 40 through the x-axis motor driver circuit 54. The x-axis motor rotation detector 54a inputs a detection signal to the controller 40. In correspondence with the detection signal, the controller 40 detects the rotational direction and the rotational amount of the x-axis motor MX. Based on such detection results, the controller 40 calculates the movement amount and the movement direction of the liquid ejection head 30 (the carriage 29) in direction X.

The y-axis motor driver circuit 55 is connected to the controller 40 through the I/F section 49. The controller 40 sends a y-axis motor drive signal to the y-axis motor driver circuit 55. In response to the y-axis motor drive signal, the y-axis motor driver circuit 55 operates to rotate the y-axis motor MY, which reciprocates the substrate stage 23, in the forward or reverse direction. For example, if the y-axis motor MY is rotated in the forward direction, the substrate stage 23 (the substrate 2) is moved in direction Y at a predetermined speed. If the y-axis motor MY is rotated in the reverse direction, the substrate stage 23 (the substrate 2) is moved in a direction opposed to direction Y at a predetermined speed.

A y-axis motor rotation detector 55a is connected to the controller 40 through the y-axis motor driver circuit 55. The y-axis motor rotation detector 55a inputs a detection signal to the controller 40. In correspondence with the detection signal, the controller 40 detects the rotational direction and the rotational amount of the y-axis motor MY. Based on such detection results, the controller 40 calculates the movement direction and the movement amount of the substrate 2 relative to the liquid ejection head 30 with respect to direction Y.

Formation of Identification Code

A method for forming the identification code 10 using the liquid ejection apparatus 20 will now be explained.

First, as shown in FIG. 5, the substrate 2 is mounted on and fixed to the substrate stage 23, which is located at the proceeding position, with the backside 2b facing upward. In this state, the end of the substrate 2 that faces in direction Y is located rearward from the guide member 26 in direction Y. The carriage 29 (the ejection head 30) is set in such a manner that, when the substrate 2 moves along direction Y, the portion in which the identification code 10 is to be formed (the dot formation area Z1) passes immediately below the carriage 29.

The controller 40 then operates the y-axis motor MY to transport the substrate 2 mounted on the substrate stage 23 in direction Y at a predetermined speed. When the substrate detector 53 detects the end of the substrate 2 facing in direction Y, the controller 40 performs calculation for determining whether the first row of the cells C (the black cells C1) has reached the position immediately below the nozzles N, in correspondence with the detection signal of the y-axis motor rotation detector 55a.

Meanwhile, in accordance with the identification code formation program, the controller 40 outputs the ejection control signal SI and supplies the electrostatic actuator drive voltage VDC to the head driver circuit 51. The ejection control signal SI has been generated based on the bit mal data BMD stored in the RAM 44. The electrostatic actuator drive voltage VDC has been generated by the drive waveform generation circuit 46. The controller 40 also provides the laser drive voltage VDL, which has been generated by the power supply circuit 48, to the laser driver circuit 52. The controller 40 then stands by till the latch signal LAT must be sent.

Afterwards, when the first row of the cells C (the black cells C1) reaches the position immediately below the nozzles N (the droplet receiving positions), the controller 40 provides the latch signal LAT to the head driver circuit 51. In response to the latch signal LAT, the head driver circuit 51 generates the open-close signals GS1 in correspondence with the ejection control signal SI. Each open-close signal GS1 is then sent to the switch circuit 59. This supplies the electrostatic actuator drive voltage VDC to each of the electrostatic actuators corresponding to the switch elements S1 that are held in a closed state. Accordingly, the droplets Fb are simultaneously ejected from the corresponding nozzles N in accordance with the electro static voltage VDC.

When receiving the ejection control signal SI that has been latched by the latch circuit 57, the laser driver circuit 52 (the delay pulse generation circuit 61) starts generation of the open-close signals GS2. The laser driver circuit 52 then stands by till the standby time T1, T2 (the time necessary for each droplet Fb to reach the radiating position of the first or second laser beam after having been received by the substrate 2 (the corresponding black cell C1)) elapses. After the standby time T1, T2 has elapsed following reception of the latch signal LAT, the laser driver circuit 52 outputs the open-close signals GS2, which have been generated by the delay pulse generation circuit 61, to the switch circuit 62. The laser drive voltage VDL is thus supplied to the semiconductor lasers L corresponding to the switch elements S2 that are held in a closed state.

The semiconductor lasers L are thus allowed to radiate the laser beams. Each of the laser beam is divided by the first substrate 31 into the first laser beam and the second laser beam. The first laser beam is radiated onto the corresponding droplet Fb immediately after the droplet Fb has reached the black cell C1 of any row of the cells C. The energy provided by each first laser beam evaporates the dispersion medium of the droplet Fb, thus drying the droplet Fb. The second laser beam is radiated onto the droplet Fb in the black cell C1 that has reached the radiating position of the second laser beam. The energy of the second laser beam bakes the manganese particles of the droplet Fb, thus bonding the metal securely with the substrate 2.

Afterwards, in a similar manner as has been described, the droplets Fb are ejected from the corresponding nozzles N and received by the substrate 2. Each of the droplets Fb is then irradiated with the first laser beam of the corresponding semiconductor laser L and dried. When the droplets Fb reach the radiating positions of the second laser beams, the droplets Fb are baked by laser radiation by the corresponding semiconductor lasers L. In this manner, the semispherical dots D defining the identification code 10 are provided in accordance with each of the rows.

After formation of all of the dots D, which define the identification code 10 provided in the dot formation area Z1, is completed, the controller 40 operates the y-axis motor MY to retreat the substrate 2 from below the liquid ejection head 30.

The illustrated embodiment, which is constructed as above-described, has the following advantages.

(1) In the illustrated embodiment, the first substrate 31, in which the cavities 32c are defined, is formed by a transparent substrate. The first laser beam radiated by each semiconductor laser L transmits through the first substrate 31. The semiconductor laser L is inclined in such a manner that radiation of the first laser beam is aimed at a position in the vicinity of the droplet Fb, which has been ejected from the corresponding nozzle N. Thus, after having been transmitted through the first substrate 31, each first laser beam reaches a portion of the substrate 2 in the vicinity of the receiving position of the corresponding droplet Fb. Contrastingly, the second laser beam of each semiconductor laser L is reflected by the surface of the first substrate 31 and then radiated onto the cell C spaced from the droplet Fb at the droplet receiving position on the substrate 2 by the distance corresponding to a predetermined number of rows. Therefore, each droplet Fb is quickly dried when located at the droplet receiving position and then subjected to baking by the single semiconductor laser L, which is arranged in correspondence with each nozzle N. Further, radiation of the first laser beams and radiation of the second laser beams are performed at different timings. This prolongs the time in which the droplets Fb are exposed to such laser radiations. Drying and baking of the droplets Fb are thus carried out efficiently. Also, the first substrate 31, which divides the laser beam of each semiconductor laser L into the first and second laser beams, forms part of the liquid ejection head 30. Accordingly, without providing an additional member, efficiency for performing the drying and baking step is improved.

(2) In the illustrated embodiment, the permittivity of the first substrate 31 (or the surface of the first substrate 31) and the inclination angle of each semiconductor laser L are selected in such a manner that the amount of the reflected light exceeds the amount of the transmitted light. Thus, in the laser beam radiated by each semiconductor laser L, the light amount corresponding to the second laser beam, which serves to bake the droplet Fb, is greater than the light amount corresponding to the first laser beam, which serves to dry the droplet Fb. Baking normally consumes more energy than drying. Thus, by increasing the energy of the second laser beam compared to that of the first laser beam, the droplet Fb is baked with further improved efficiency.

(3) In the illustrated embodiment, each oscillation plate 32b is formed by a side wall of the corresponding cavity 32c. The oscillation plate 32b is oscillated by the electrode 33a of the corresponding electrostatic actuator. The oscillation plate 32b, the oscillation chamber 32f, and the electrostatic actuator function as pressurization means that operates to eject the droplets Fb. A smaller-size liquid ejection head 30 thus can be formed, unlike a case in which a piezoelectric element is provided outside a corresponding cavity with a glass or plastic plate forming an oscillation plate arranged between the piezoelectric element and the cavity. Further, in the case employing the piezoelectric element, variation may be caused in the thicknesses of the piezoelectric elements or the thicknesses of adhesives applied to the oscillation plates. However, in the illustrated embodiment, since the side wall of each cavity 32c is defined as the oscillation plate 32b and liquid ejection is performed by electrostatic force, the ejection performance of the liquid ejection head 30 is stabilized.

(4) In the illustrated embodiment, the nozzle grooves 32a and the grooves communicating with the corresponding nozzle grooves 32a are defined in the surface of the second substrate 32. The nozzle grooves 32a are aligned and equally spaced. Each of the grooves includes the section defining the cavity 32c, the section defining the orifice 32d, and the section defining the liquid retainer portion 32e. Thus, only by holding the second substrate 32 in tight contact with the first substrate 31 formed like a flat plate, the grooves are shielded by the first substrate 31 in such a manner that the cavities 32c, each of which has the side wall forming the oscillation plate 32b, the orifices 32d, and the liquid retainer portions 32e are defined. Accordingly, since the first substrate 31 has a simple configuration, the radiating positions of the first laser beams and the radiating positions of the second laser beams can be more accurately determined.

(5) In the illustrated embodiment, the reference (the reference point Tk) for determining the operational timings of each semiconductor laser L corresponds to the fall of the latch signal LAT, in accordance with which the nozzles N start to operate. The positions at which the droplets Fb are received by the substrate 2 after having been ejected by the corresponding nozzles N are thus accurately acknowledged. Accordingly, laser radiation onto the droplets Fb can be performed accurately, thus reliably subjecting the droplets Fb to drying and baking. Also, the load of the control section 43 is reduced.

(6) In the illustrated embodiment, in the sixteen semiconductor lasers L, only the semiconductor lasers L corresponding to the activated electrostatic actuators are turned on. This saves the power consumed by the semiconductor lasers L.

It should be apparent to those skilled in the art that the present invention may be embodied in many other specific forms without departing from the spirit or scope of the invention. Particularly, it should be understood that the invention may be embodied in the following forms.

In the illustrated embodiment, the laser beam radiated by each semiconductor laser L is divided into the first laser beam and the second laser beam by the transparent first substrate 31, which defines the cavities 32c. However, any different suitable structure may be employed as long as a portion of the liquid ejection head 30 is formed by a transmittable member that separates the first laser beam from the second laser beam. For example, only a lower portion of the first substrate 31 onto which the laser beam is radiated by each semiconductor laser L may be formed by a transparent member. Alternatively, instead of using the transparent substrate, the first substrate 31 may be formed by a transparent member having a surface or interior that is treated so as to separate a transmitted component from a reflected component.

In other words, the transmittable member is a member that transmits at least some of incoming light. The light is thus divided into the first laser beam and the second laser beam. The first laser beam reaches the position coinciding with the droplet receiving position or the position in the vicinity of the droplet receiving position. The second laser beam reaches a position different than the radiating position of the corresponding first laser beam. The transmittable member is thus not restricted to the aforementioned transparent member having the surface or the interior treated for separating the transmitted element from the reflected element, which is, for example, a half mirror. The transmittable member may be formed of non-treated raw glass.

In the illustrated embodiment, the position of each semiconductor laser L is fixed and the laser radiation is performed from this position. However, an adjuster 70 (indicated by the double-dotted broken lines in FIG. 7) may be added for adjusting the orientation of each semiconductor laser L relative to the liquid ejection head 30. That is, for example, only the radiating position of each first laser beam may be substantially fixed at the receiving position of the corresponding droplet Fb or the position in the vicinity of such position. In this case, the semiconductor laser L is pivoted in such a manner that the radiating position of the second laser beam moves in correspondence with movement of the substrate 2 carrying the droplets Fb. More specifically, a movement follower is provided for moving each semiconductor laser L in correspondence with the movement of the substrate 2. This prolongs the radiation time of the second laser beam, which performs baking, and thus promotes the baking.

In the illustrated embodiment, the delay pulse generation circuit 61 of the laser driver circuit 52 outputs the open-close signals GS2 after the standby time T1, T2 has elapsed. Instead of this, the controller 40 may measure the standby time T1, T2 and output a control signal to the laser driver circuit 52 after the standby time T1, T2 has elapsed. In response to the control signal, the laser driver circuit 52 outputs the open-close signals GS2, which have been generated in correspondence with the ejection control signal SI from the latch circuit 57 of the head driver circuit 51.

In the illustrated embodiment, the standby time T1, T2 is set with reference to the fall of the latch signal LAT. However, the standby time T1, T2 may be set with reference to the rise of the latch signal LAT. In other words, the reference for setting the standby time T1, T2 may be any suitable timing as long as a drive signal for the electrostatic actuators is involved as a reference.

In the illustrated embodiment, the electrostatic actuators are used as pressurizing portions for ejecting the droplets Fb. However, any different suitable structures may be employed as the pressurizing portions that pressurize the pressure chambers (the cavities 32c) as long as a portion of the liquid ejection head 30 corresponding to the semiconductor lasers L divides the laser beams into the first laser beams and the second laser beams. For example, a method using piezoelements or air bubbles may be employed for pressurizing the cavities 32c, thus ejecting the droplets Fb. If the piezoelements are employed, each piezoelement is placed in contact with the corresponding oscillation plate 32b that defines the cavity 32c. In response to a drive signal for the piezoelement, the piezoelement operates to change the volume of the cavity 32c and thus eject the droplet Fb. Alternatively, if the method using the air bubbles is selected, the air bubbles are generated in the cavities 32c. The ejection of the droplets Fb is carried out by bursting the air bubbles. In both cases, the first laser beams are separated from the second laser beams by a portion of the liquid ejection head 30. Thus, drying and baking of the droplets Fb that have been ejected by the nozzles N and received by the substrate 2 are efficiently performed.

In the illustrated embodiment, the present invention is embodied as the liquid ejection apparatus 20 that forms the dots D that define the identification code 10. However, the present invention may be applied to a liquid ejection apparatus that forms metal wiring on a substrate by ejecting liquid that contains metal wiring material, or functional material, onto the substrate. The invention is also applicable to a liquid ejection apparatus that forms an insulating film. In either case, the liquid ejection apparatuses are allowed to efficiently achieve a drying and baking step, which follows an ejection step.

Although each dot D of the illustrated embodiment has the semispherical shape, the dot D may be shaped in any other suitable manner. For example, the dot D may have an oval shape or a linear shape, which is like a bar that defines a bar code, as viewed from above.

In the illustrated embodiment, the identification code 10 is defined by the two-dimensional code. However, the identification code 10 may be formed by a bar code, a character, a numeral, or a mark.

Although the identification code 10 is formed on the substrate 2, which is a display substrate, in the illustrated embodiment, the identification code 10 may be provided on a silicon wafer, a resin film, or a metal plate.

In the illustrated embodiment, the identification code 10 is formed on the display module 1. However, the display module 1 may be changed to a display module of, for example, an organic electroluminescence display or a field effect type device (an FED or an SED) having a flat electron emission element. The field effect type device emits light from a fluorescent substance using the electrons emitted by the electron emission element. Further, the substrate 2 or the like on which the identification code 10 is formed may be used in any different suitable electronic devices other than the displays.

Therefore, the present examples and embodiments are to be considered as illustrative and not restrictive and the invention is not to be limited to the details given herein, but may be modified within the scope and equivalence of the appended claims.

The invention claimed is:

1. A liquid ejection apparatus comprising:
   an ejecting portion that ejects a droplet of a liquid containing a functional material onto an object, the ejecting portion including a pressure chamber in which the liquid is retained, a pressurizing portion, and a transmittable member, the pressurizing portion pressurizing the pressure chamber so as to eject the droplet; and a laser radiating portion that radiates a laser beam onto the transmittable member, the transmittable member dividing the laser beam into a first laser beam and a second laser beam, the first laser beam transmitting through the transmittable member in such a manner that a radiating position of the first laser beam coincides with a droplet receiving position at which the droplet is received by the object or a position in the vicinity of the droplet receiving position, and the second laser beam reaching a position defined on the object different from the radiating position of the first laser beam.

2. The apparatus according to claim 1, wherein the first laser beam is radiated onto the droplet immediately after the droplet has been received by the object, and wherein the second laser beam is radiated onto the droplet after the droplet has been irradiated with the first laser beam.

3. The apparatus according to claim 1, wherein the transmittable member divides the laser beam in such a manner that the amount of the second laser beam exceeds the amount of the first laser beam.

4. The apparatus according to claim 1, wherein the transmittable member includes a semi-transmittable reflective film.

5. The apparatus according to claim 4, wherein the second laser beam is reflected by the reflective film, and wherein the amount of the second laser beam exceeds the amount of the first laser beam that transmits through the reflective film.

6. The apparatus according to claim 1, wherein the transmittable member is a first substrate, the second laser beam being reflected by the first substrate, and wherein the ejecting portion further includes a second substrate, the first substrate and the second substrate defining the pressure chamber.

7. The apparatus according to claim 1, further comprising an adjuster that changes the orientation of the laser radiating portion relative to the ejecting portion.

8. The apparatus according to claim 1, further comprising a substrate that defines the pressure chamber, the substrate including a flexible portion opposed to the pressure chamber.

9. The apparatus according to claim 8, wherein the pressurizing portion includes the flexible portion and an electrode opposed to the flexible portion, the flexible portion being deformed by electrostatic force generated by the electrode.

10. The apparatus according to claim 1, wherein the first laser beam is diagonally radiated onto a surface of the object.

11. A liquid ejection apparatus comprising:

an ejecting portion that ejects a droplet of a liquid containing a functional material onto an object, the ejecting portion including a transmittable member; and a laser radiating portion that radiates a laser beam onto the transmittable member, the transmittable member dividing the laser beam into a first laser beam and a second laser beam, the first laser beam being radiated onto the droplet immediately after the droplet has been received by the object, and the second laser beam being radiated onto the droplet after the droplet has been irradiated with the first laser beam.

* * * * *